(12) United States Patent
Fragale (10) Patent No.: US 7,987,658 B1
(45) Date of Patent: Aug. 2, 2011

(54) MULTI-PURPOSE GARDEN TOOL WITH PIVOTABLE GARDENING HEAD

(76) Inventor: Frank Fragale, Waltham, MA (US)

( * ) Notice: Subject to any disclaimer, the term of this patent is extended or adjusted under 35 U.S.C. 154(b) by 0 days.

(21) Appl. No.: 12/804,402

(22) Filed: Jul. 21, 2010

(51) Int. Cl.
*A01D 7/00* (2006.01)
(52) U.S. Cl. ............... 56/400.19; 56/400.04; 15/144.1; 16/900; 294/53.5
(58) Field of Classification Search ............. 56/400.01, 56/400.04–400.07, 400.19, 400.2, 400.1; 16/436, 900; 294/53.5; 15/144.1, 172
See application file for complete search history.

(56) References Cited

U.S. PATENT DOCUMENTS

| | | | |
|---|---|---|---|
| 877,614 A | | 1/1908 | Thompson |
| 977,604 A | * | 12/1910 | Deussen .................. 56/400.06 |
| 987,008 A | | 3/1911 | McKibbin |
| 1,469,957 A | * | 10/1923 | Rich ............................ 172/372 |
| 1,504,913 A | | 8/1924 | Simoncelli |
| 1,566,868 A | * | 12/1925 | Hinkelmann ................ 172/372 |
| 1,784,108 A | | 12/1930 | Pearson |
| 2,126,023 A | | 8/1938 | McGoldrick |
| 2,314,685 A | | 3/1943 | Brooke |
| 2,377,730 A | | 3/1943 | Vosbikian |
| 3,234,720 A | * | 2/1966 | Blodgett .................... 56/400.05 |
| 3,733,636 A | | 5/1973 | Osadsky |
| 4,212,150 A | | 7/1980 | Dmochowski |
| 4,476,939 A | | 10/1984 | Wallace |
| 4,606,089 A | | 8/1986 | King |
| 4,848,074 A | * | 7/1989 | Allen ........................ 56/400.12 |
| 5,185,992 A | | 2/1993 | Garcia |
| 5,461,849 A | | 10/1995 | Allen |
| 5,609,215 A | | 3/1997 | Rios et al. |
| 5,788,299 A | | 8/1998 | Wilkinson |
| 5,881,545 A | | 3/1999 | Wilson |
| 5,924,816 A | | 7/1999 | Schuele |
| 5,927,058 A | * | 7/1999 | Hsu ............................. 56/400.16 |
| 5,971,653 A | | 10/1999 | Harpell |
| 6,283,521 B1 | * | 9/2001 | Agrati ........................... 294/50.8 |
| 6,367,236 B1 | | 4/2002 | Marcone |
| 6,467,551 B1 | * | 10/2002 | Washek ......................... 172/378 |
| 6,619,023 B1 | | 9/2003 | Marcone |
| 6,694,717 B1 | | 2/2004 | Dedrick |
| 6,948,302 B1 | * | 9/2005 | Kalloo et al. .............. 56/400.19 |
| D578,846 S | | 10/2008 | Coats |
| 2002/0073681 A1 | | 6/2002 | Roser et al. |
| 2005/0134064 A1 | * | 6/2005 | Nies ................................ 294/51 |

* cited by examiner

*Primary Examiner* — Robert E Pezzuto
*Assistant Examiner* — Mai Nguyen
(74) *Attorney, Agent, or Firm* — Kriegsman & Kriegsman

(57) ABSTRACT

A multi-purpose tool includes, in one embodiment, an elongated pole and a head that are pivotally joined by a coupling mechanism. The head is a unitary member that includes a semi-circular edger plate and a comb-like rake. The coupling mechanism includes a pivot screw pivotally connecting the pole to the gardening head, a lock rod extending longitudinally through the elongated pole, and a pull cam mounted within one end of the hollow pole, the pull cam being threadingly coupled to one end of the lock rod. By disposing the gardening head in a variety of fixed positions relative to the pole, a plurality of distinct gardening instruments can be created. Locking the position of the gardening head relative to the elongated pole is achieved through rotation of a handle that is mounted onto the free end of the pole, the handle being connected to the free end the lock rod.

6 Claims, 13 Drawing Sheets

MULTI-PURPOSE GARDEN TOOL WITH PIVOTABLE GARDENING HEAD

BACKGROUND OF THE INVENTION

The present invention relates generally to tools and more particularly to tools designed principally for use in gardening.

Individuals that engage in landscaping often require a large variety of different gardening tools to perform standard tasks. Examples of well known and widely used gardening tools include, but are not limited to, rakes, aerators, edgers and hoes. As can be appreciated, the requirement that a landscaper possess a large number of individual gardening tools introduces significant issues with respect to storage, handling and cost, which is highly undesirable.

Consequently, multi-purpose garden tools are well known in the art. Multi-purpose garden tools commonly include a plurality of task-specific gardening heads that are coupled to a common elongated handle. By adjusting the relative position of one or more of the heads, the tool can be configured into a plurality of distinct gardening instruments (e.g., rakes, aerators, edgers and hoes). In this manner, the single multi-purpose tool described in detail above can be used to perform a plurality of different gardening tasks, thereby resolving some of the storage, handling and cost-related issues that are typically associated with the traditional method of utilizing a large number of separate gardening instruments.

In U.S. Pat. No. 6,694,717 to T. Derick, which is incorporated herein by reference, there is disclosed one example of a multi-purpose garden tool. Specifically, the garden tool includes an elongated handle having a tubular sheath connected to its bottom end. A push hoe blade has a shank that is connected to the bottom end of the tubular sheath. The push hoe blade has a foot flange formed along its top edge to provide a platform against which the garden tool's user can push his foot when using the garden tool as a shovel, a push hoe or an edger. The rake head has its top end pivotally connected to the handle adjacent its bottom end. A rake head can be rotated from a stored position to a working position. There is structure for locking the rake head in both the stored position and the operating position.

In U.S. Pat. No. 5,609,215 to G. C. Rios et al., which is incorporated herein by reference, there is disclosed a combination hoe and pivoting rake tool including a handle. A hoe portion is dimensioned for coupling with an end of the handle. A central rake portion is secured to the hoe portion. The central rake portion has a plurality of teeth extending outwardly therefrom perpendicular to the hoe portion. A pair of outer rake portions each have a plurality of teeth extending downwardly therefrom. Each of the outer rake portions are pivotally coupled with one of opposing ends of the central rake portion. A pivoting mechanism is secured to a lower end portion of the handle and pivotally coupled with the pair of outer rake portions.

Multi-purpose garden tools of the type described in detail above have been found to suffer from a few notable shortcomings.

As a first shortcoming, multi-purpose garden tools of the type described above typically rely upon relatively complex mechanical means to transform the tool into each of its intended gardening instruments. As a result, these types of multi-purpose gardening tools have been found to be both expensive to manufacture and difficult to operate, which is highly undesirable.

As a second shortcoming, multi-purpose garden tools of the type described above typically allow for transformation between no more than two gardening instruments. However, it has been found that many landscaping professionals routinely require several different gardening tools during the course of a particular project. Accordingly, a multi-purpose gardening tool that is only capable of transformation between a pair of gardening instruments often fails to adequately meet the needs of the user when conducting standard landscaping tasks, which is highly undesirable.

SUMMARY OF THE INVENTION

It is an object of the present invention to provide a novel gardening tool. It is another object of the present invention to provide a novel gardening tool that can be reconfigured for use in conjunction with a plurality of distinct gardening tasks.

It is yet another object of the present invention to provide a gardening tool of the type as described above that has a limited number of parts, is inexpensive to manufacture and is ease to use.

Therefore, according to one feature of the present invention, there is provided a multi-purpose gardening tool, the tool comprising (a) an elongated, hollow pole having a first end and a second end, (b) a unitary gardening head, (c) a coupling mechanism for pivotally connecting the second end of the elongated pole to the gardening head, the coupling mechanism releasably locking the position of the gardening head relative to the elongated pole in a variety of fixed positions to create a plurality of distinct gardening instruments, and (d) a handle rotatably mounted on the first end of the pole, the handle being fixedly connected to the coupling mechanism, wherein actuation of the coupling mechanism in order to releasably lock the position of the gardening head relative to the elongated pole is achieved through rotation of the handle.

According to another feature of the present invention, there is provided a multi-purpose gardening tool, the tool comprising (a) a rake, the rake comprising (i) an elongated rake pole having a first end and a second end, and (ii) a rake head mounted on the second end of the rake pole, (b) a spade, the spade comprising, (i) a spade pole having a first end and a second end, and (ii) an edger plate mounted onto the first end of the spade pole, and (c) a coupling mechanism for coupling the rake and spade together in a front-to-back relationship, the rake capable of being slidably displaced relative to the spade, the coupling mechanism releasably locking the position of the rake relative to the spade in a variety of fixed positions to create a plurality of distinct gardening instruments.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Multi-Purpose Gardening Tool 11

Figure 1A:
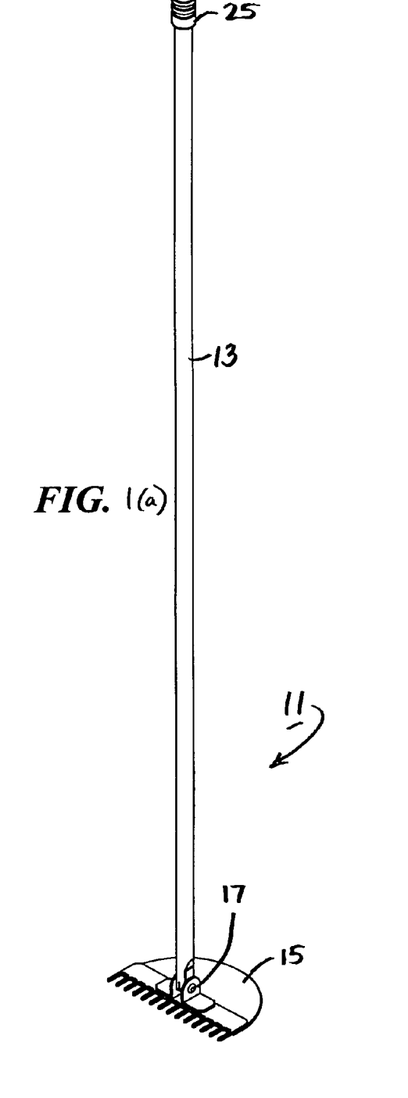
FIGS. 1(a) and 1(b) are top perspective and fragmentary, top perspective views, respectively, of a first embodiment of a multi-purpose gardening tool, the tool being constructed according to the teachings of the present invention.
Figure 1B:
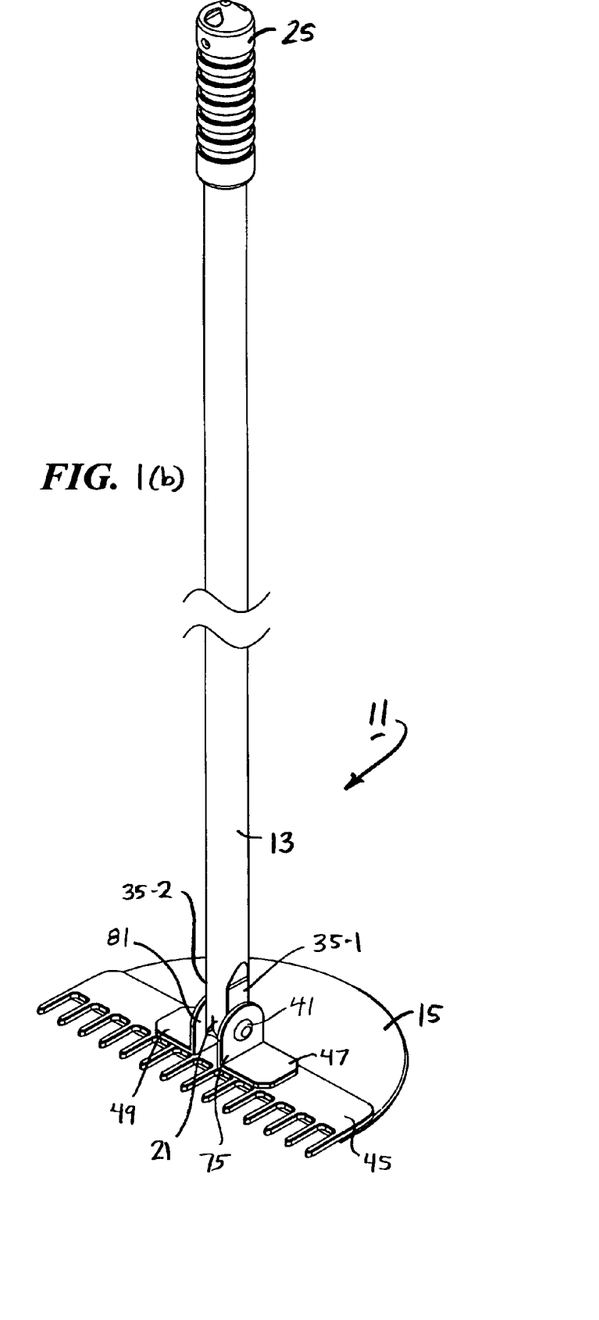

Referring now to FIGS. 1(a) and 1(b), there is shown a first embodiment of a multi-purpose gardening tool, the gardening tool being constructed according to the teachings of the present invention and identified generally by reference numeral 11. As will be described further in detail below, tool 11 can be reconfigured to create a plurality of distinct gardening instruments, which is highly desirable.

Figures 2A, 2B:
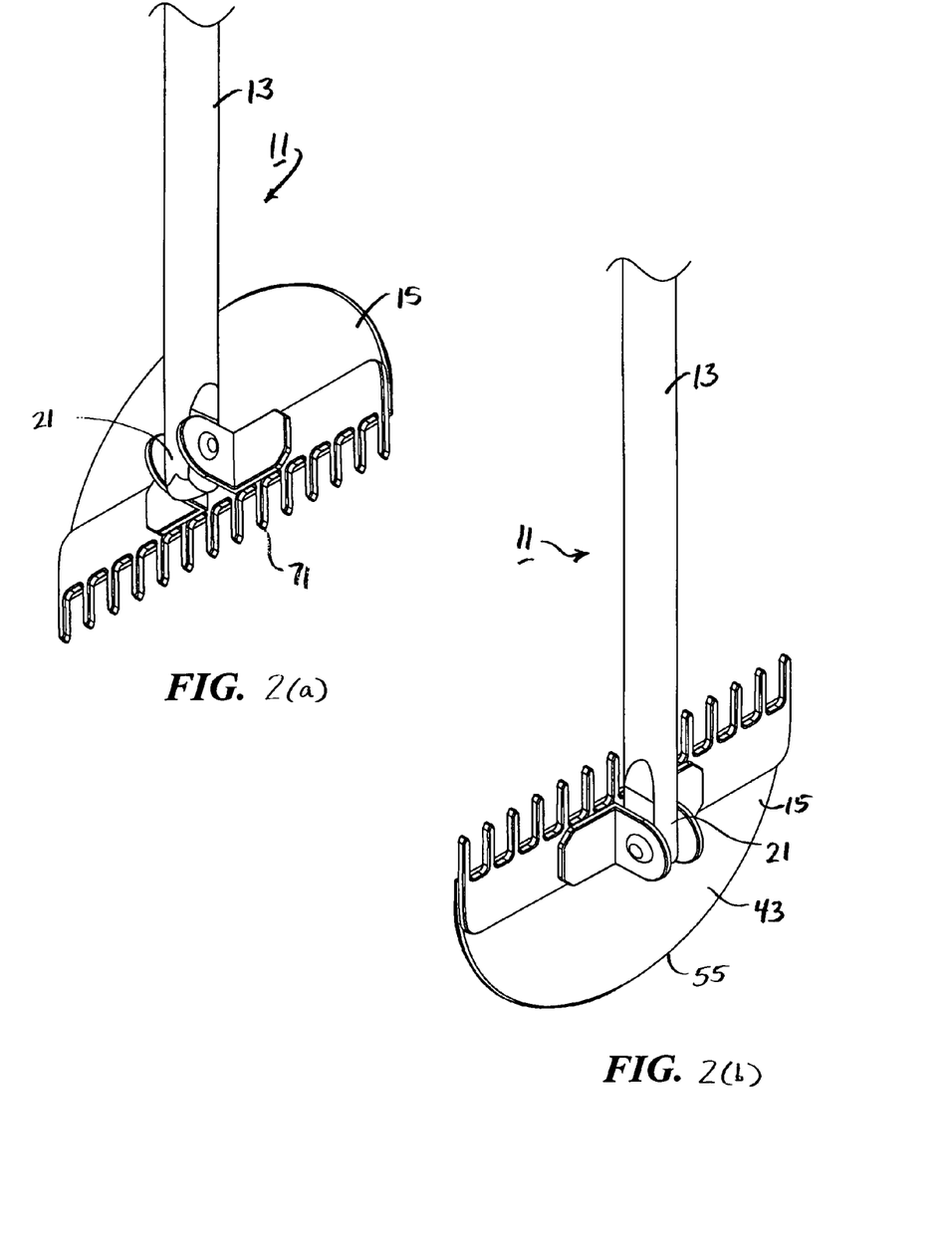
FIG. 2(a) is a fragmentary, bottom perspective view of the tool shown in FIG. 1(a), the tool being shown configured for use as an aerator.
FIG. 2(b) is a fragmentary, top perspective view of the tool shown in FIG. 1(a), the tool being shown configured for use as an edger.
Figure 3A:
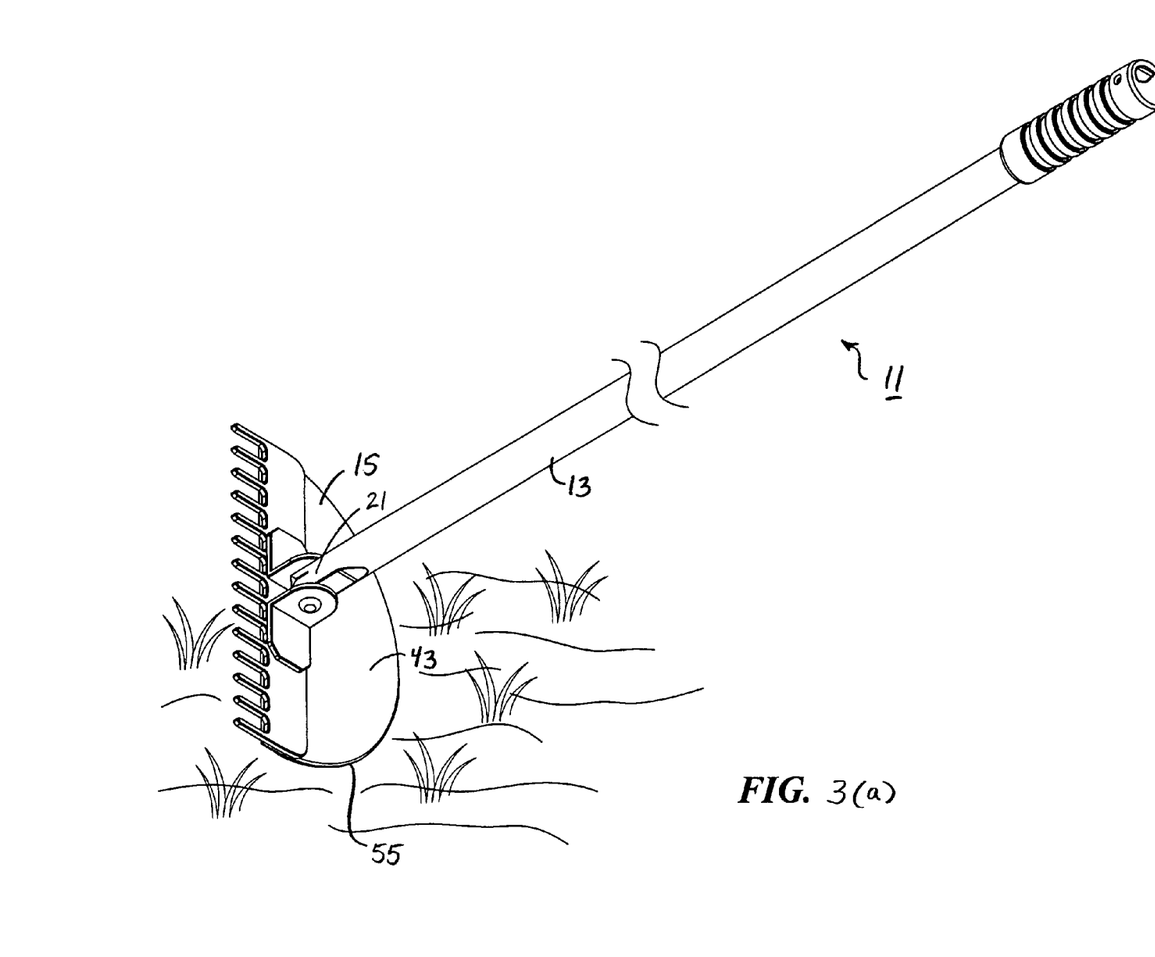
FIG. 3(a) is a fragmentary, top perspective view of the tool shown in FIG. 1(a), the tool being shown configured for use as a hoe displayed in operation in a garden area.
Figure 3B:
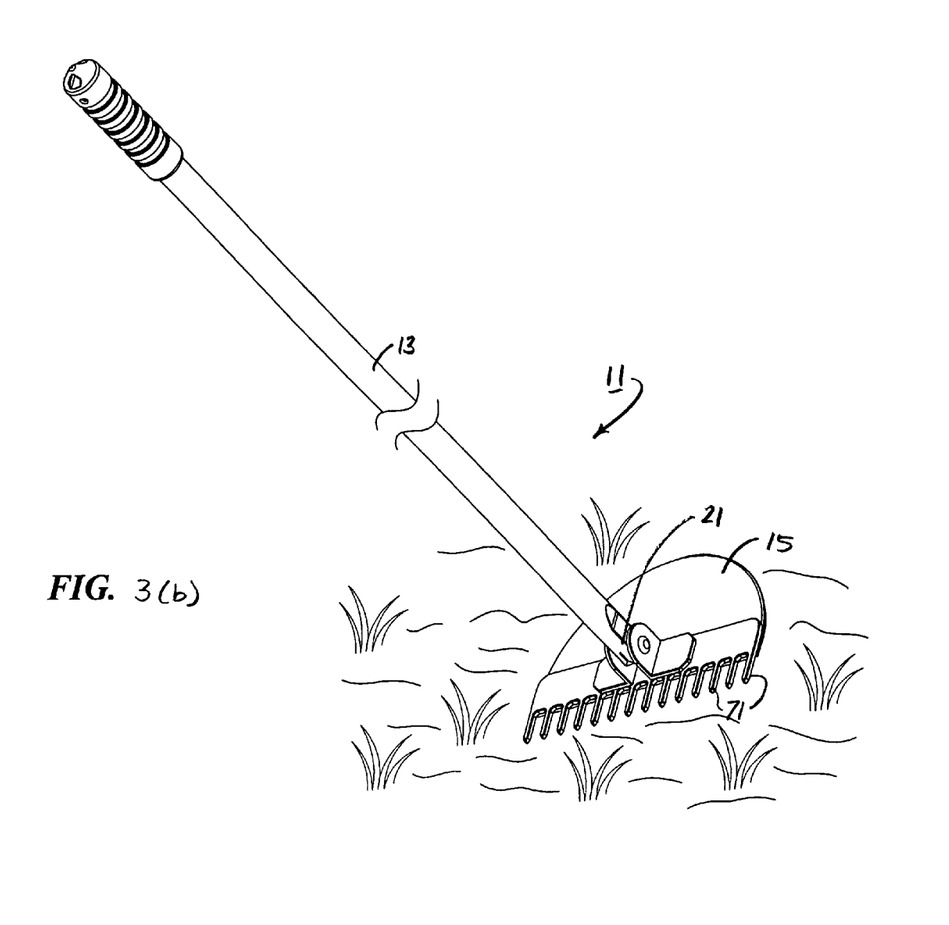
FIG. 3(b) is a fragmentary, bottom perspective view of the tool shown in FIG. 1(a), the tool being shown configured for use as a rake displayed in operation in a garden area.

Tool 11 comprises an elongated pole 13, a multi-function gardening head 15 and a coupling mechanism 17 for pivotally connecting one end of pole 13 to head 15, coupling mechanism 17 being capable of releasably retaining head 15 in a fixed orientation relative to pole 13. By pivoting and subsequently locking head 13 in a plurality of fixed positions relative to pole 15, tool 11 is capable of being configured into, inter alia, an aerator (as shown in FIG. 2(a)), an edger/scraper (as shown in FIG. 2(b)), a hoe (as shown in FIG. 3(a)), or a rake (as shown in FIG. 3(b)), as will be described further in detail below.

Figures 4, 7:
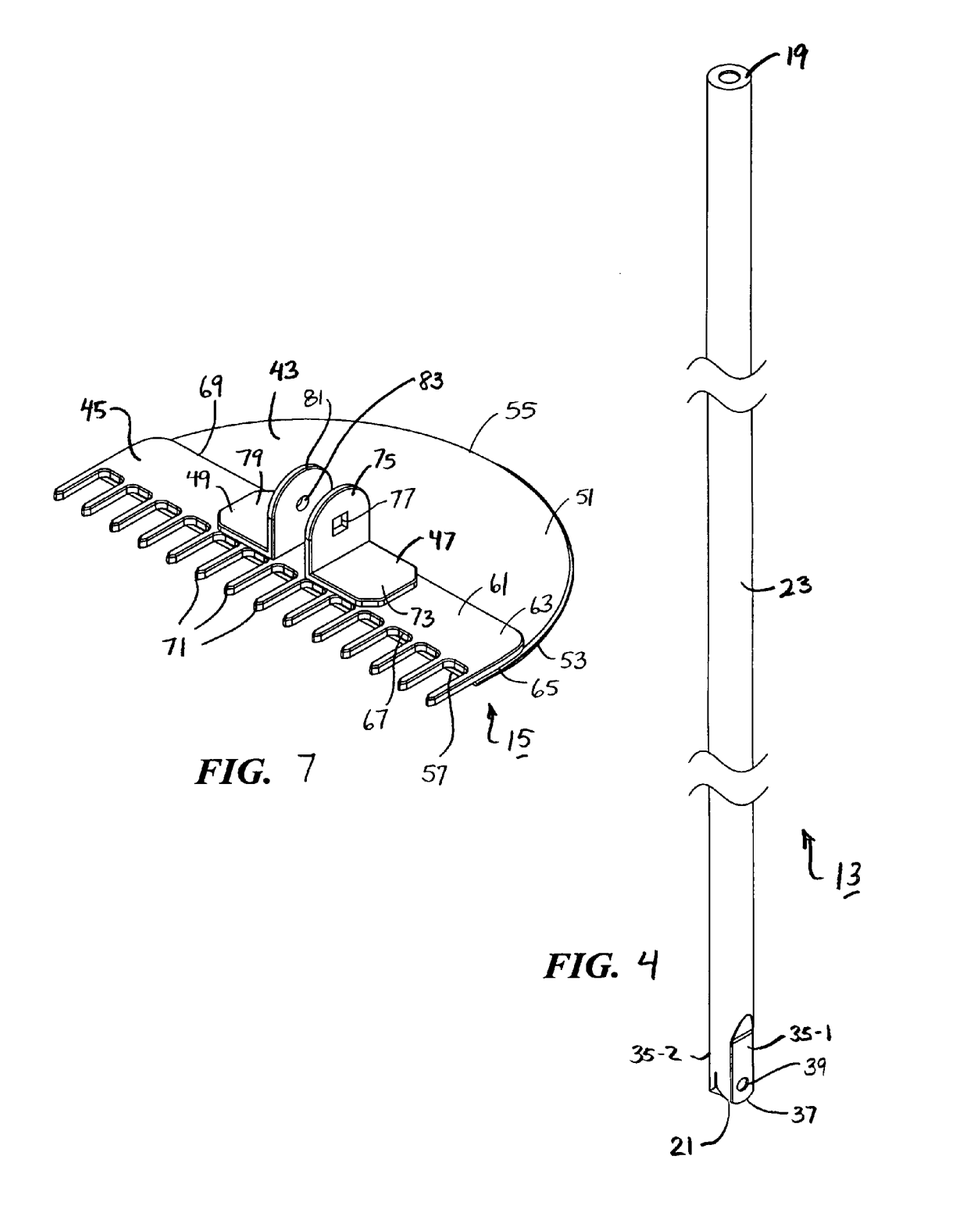
FIG. 4 is a fragmentary, top perspective view of the pole shown in FIG. 1(a)
FIG. 7 is a top perspective view of the gardening head shown in FIG. 1(a)

As seen most clearly in FIG. 4, pole 13 is in the form of an elongated tubular member that is constructed of a rigid and durable material, such as steel. Pole 13 is approximately 64.0 inches in length and includes an open first end 19, an open second end 21, and an intermediate portion 23 that connects first end 19 to second end 21, intermediate portion 23 being annular in transverse cross-section along the entirety of its length.

Figure 5A:
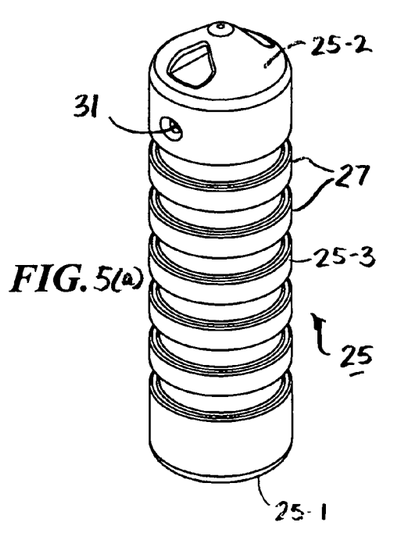
FIG. 5(a) is a top perspective view of the handle shown in FIG. 1(a)

Referring now to FIGS. 1(a), 1(b), 5(a) and 5(b), a handle, or grip, 25 is telescopingly mounted on first end 19 of pole 13 and is capable of rotational movement relative thereto. Grip 25, shown in isolation in FIGS. 5(a), is preferably molded from a suitable plastic material, such as acrylonitrile butadiene styrene (ABS), and includes an open first end 25-1, an enclosed second end 25-2 and an intermediate section 25-3 connecting first and second ends 25-1 and 25-2, the exterior surface of intermediate section 25-3 being provided with a plurality of annular rings 27 to facilitate handling.

Figure 5B:
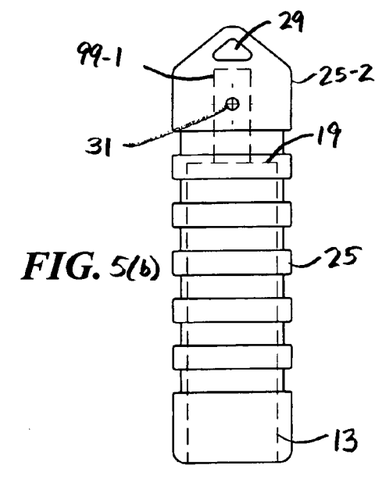
FIG. 5(b) is a front plan view of the handle shown in FIG. 1(a), the handle being shown mounted on the pole and lock rod, the pole and lock rod being shown in dashed form.

As seen most clearly in FIG. 5(b), the inner diameter of open first end 25-1 and the majority of intermediate section 25-3 are dimensioned to fittingly mount onto first end 19 of pole 13 but, at the same time, allow for rotation relative to pole 13 about its longitudinal axis. In this manner, handle 25 can be used as a direct means for manually controlling lockable coupling mechanism 17, as will be discussed further below.

Figure 6A:
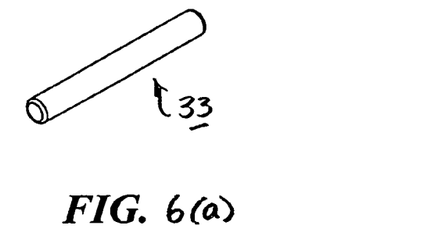
FIGS. 6(a) and 6(b) are top perspective and front plan views, respectively, of the handle pin for the tool shown in FIG. 1(a)
Figure 6B:
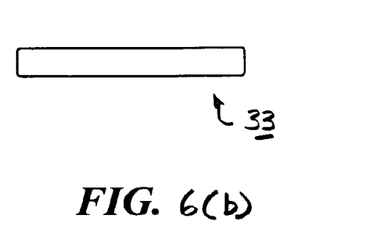

Enclosed second end 25-2 of handle 25 is shaped to include a transverse channel 29 that is triangular in cross-section, channel 29 serving as means for hanging tool 11 onto a hook or other similar storage element. In addition, enclosed second end 25-2 includes a transverse opening, or thru-hole, 31 that is generally circular in cross-section. As will be described further below, a handle pin 33, shown in isolation in FIGS. 6(a) and 6(b), is sized and shaped for fitted insertion through opening 31 and into engagement with coupling mechanism 17. As such, handle pin 33 serves to mechanically connect handle 25 with lockable coupling mechanism 17.

Referring back to FIG. 4, second end 21 of pole 13 is shaped to include a pair of opposing, flattened side surfaces 35-1 and 35-2 and a rounded, free end 37. In addition, a circular hole 39 extends transversely through second end 21 from side surface 35-1 to side surface 35-2. As will be described further below, hole 39 is shaped to receive a pivot screw 41 from coupling mechanism 17 that is in turn used to pivotally join head 15 to pole 13.

Referring now to FIGS. 1(a), 1(b) and 7, multi-function gardening head 15 comprises a semi-circular edger plate 43, a comb-like rake 45 secured to edger plate 43, a first right angle bracket 47 secured to rake 45, and a second right angle bracket 49 secured to rake 45. As noted briefly above, pivot screw 41 pivotally connects gardening head 15 to elongated pole 13 to render tool 11a unitary device.

Edger plate 43 is constructed as a semi-circular sheet of metal, such as stamped steel, and includes a flattened top surface 51, a flattened bottom surface 53, a curved rear edge 55 and a straight front edge 57. Curved rear edge 55 is preferably beveled or otherwise sharpened to facilitate use in particular gardening applications. In addition, a short flange (not shown) is preferably formed on bottom surface 53 along the length of straight front edge 57, the flange serving as a step surface for driving head 15 into the intended material by foot.

Rake 45 is constructed as a comb-like sheet of metal, such as stamped steel, and includes a rectangular strip 61 comprising a flattened top surface 63, a flattened bottom surface 65, a straight front edge 67 and a straight rear edge 69. Bottom surface 65 of rake 43 is permanently mounted onto top surface 51 of edger plate 43 along straight front edge 57 by any conventional securement means, such as through spot welding, to render head 15 a unitary device.

Rake 45 additionally includes a plurality of sharpened tines 71 that extend orthogonally out from front edge 67 in an equidistantly spaced apart arrangement. The free end of each tine 71 tapers to a sharpened, 60 degree point to facilitate insertion into soil, dirt or other similar elements.

First right angle bracket 47 is constructed from a sheet of rigid metallic material, such as steel, that is bent at a right angle to form a horizontal tab 73 and a vertical tab 75. An opening 77, square-shaped in transverse cross-section, extends through vertical tab 75 and is dimensioned to receive pivot screw 41 in order to couple head 15 to pole 13, as will be described further below.

Similarly, second right angle bracket 49 is constructed from a sheet of rigid metallic material, such as steel, that is bent at a right angle to form a horizontal tab 79 and a vertical tab 81. An opening 83, circular in transverse cross-section, extends through vertical tab 81 and is dimensioned to receive pivot screw 41 in order to couple head 15 to pole 13, as will be described further below.

The bottom surfaces of horizontal tabs 73 and 79 are permanently mounted onto top surface of 63 of rake 45 by any conventional securement means, such as through spot welding, to render head 15 a unitary device. As seen most clearly in FIG. 1(b), first and second brackets 47 and 49 are secured to rake 45 such that vertical tabs 75 and 81 are spaced apart a distance that is suitable to fittingly receive second end 21 of pole 13, with flattened surface 35-1 of pole 13 abutting against vertical tab 75 of bracket 47 and flattened surface 35-2 of pole 13 abutting against vertical tab 81 of bracket 49.

As noted briefly above, coupling mechanism 17 includes a pivot screw 41 for pivotally joining head 15 to pole 13. As a feature of the present invention, pivot screw 41 can be operated by handle 25 to releasably lock head 15 in a number of fixed orientations relative to pole 13, thereby enabling tool 11 to be configured into a number of distinct gardening instruments.

Figure 8:
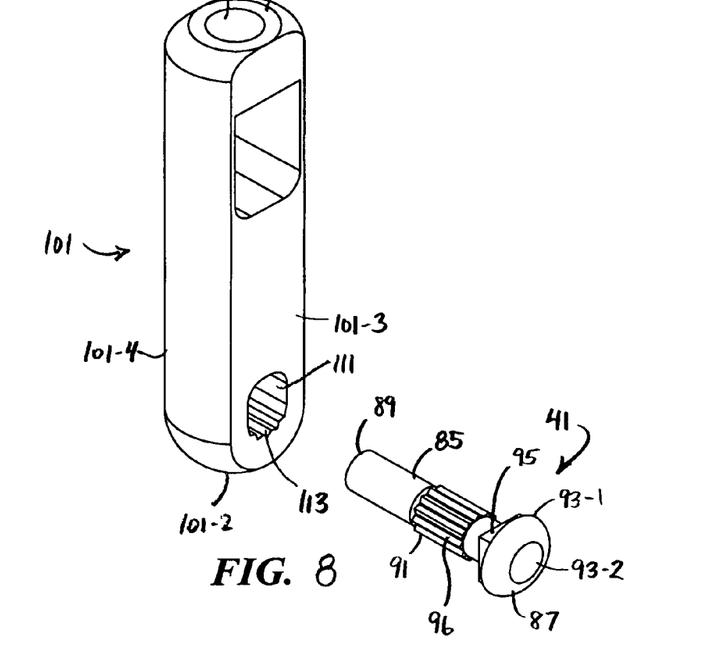
FIG. 8 is an exploded, top perspective view of selected components of the coupling mechanism for the tool shown in FIG. 1(a)

Referring now to FIG. 8, pivot screw 41 is preferably constructed of a rigid and durable metallic material, such as steel, and includes an elongated, cylindrical pin 85 that includes a first end 87, a second end 89 and an intermediate portion 91.

First end 87 of screw 41 is preferably in the form of an enlarged disc-shaped button that includes flattened inner and outer surfaces 93-1 and 93-2. In addition, a projection 95, square-shaped in transverse cross-section, is formed onto intermediate portion 91 of screw 41 in abutment against inner surface 93-1 of first end 87.

Second end 89 of screw 41 is preferably threaded along its exterior, the threading not being shown herein for simplicity purposes only. A nut (now shown), such as a zinc plated, nylon insert, hexagonal lock nut, is preferably mounted on second end 89 in threaded engagement therewith to keep screw 41 in place, as will be described further below.

A portion of intermediate portion 91 is knurled, or otherwise roughened, so as to create a plurality of outwardly extending engagement teeth, or tips, 96. As will be described further below, tips 96 serve as a roughened surface that is used to lock the orientation of head 15 relative to pole 13.

As can be appreciated, screw 41 is designed for fitted insertion through brackets 47 and 49 in head 15 as well as hole 39 in second end 21 of pole 13 order to pivotally join head 15 with pole 13. With enlarged first end 87 of screw 41 disposed flush against the outer surface of vertical tab 75 and second end 89 of screw 41 extending out through opening 83 in vertical tab 81, the nut is threadingly mounted onto second end 89 and coaxially driven inward until drawn into direct contact against vertical tab 81 of bracket 49. In this manner, enlarged first end 89 and the nut serve to retain pivot screw 41 in place and thereby preclude axial displacement.

Furthermore, it is to be understood that screw 41 is inserted through head 15 and pole 13 such that square-shaped projection 95 is fittingly retained within complementary square-shaped opening 77 in bracket 47. Accordingly, it is to be understood that the fitted relationship between projection 95 and opening 77 in bracket 47 precludes rotation of screw 41 about is longitudinal axis.

In addition to pivot screw 41, coupling mechanism 17 includes a lock rod 99 and a pull cam 101. As will be described further below, pull cam 101 connects one end of lock rod 99 to pivot screw 41. Accordingly, rotation of lock rod 99 using handle 25 drives pull cam 101 into selective engagement with pivot screw 41, thereby enabling the user to releasably retain head 15 in a plurality of fixed orientations relative to pole 13.

Figure 9A:
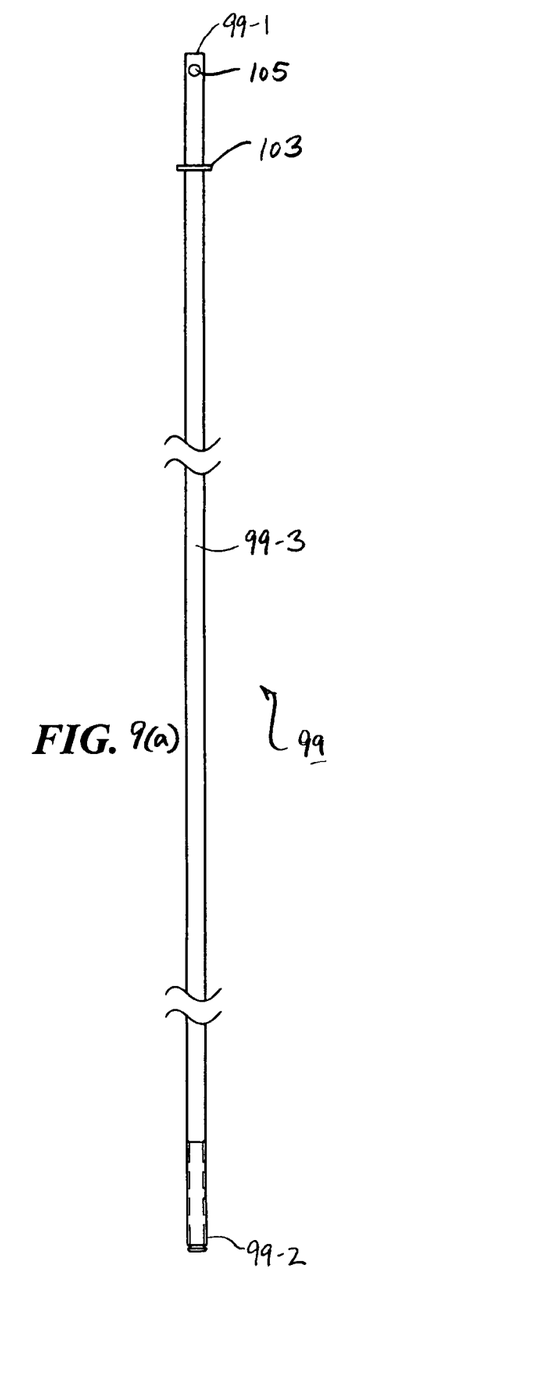
FIGS. 9(a) and 9(b) are fragmentary, front plan and top perspective views, respectively, of the lock rod shown in FIG. 5(b)
Figure 9B:
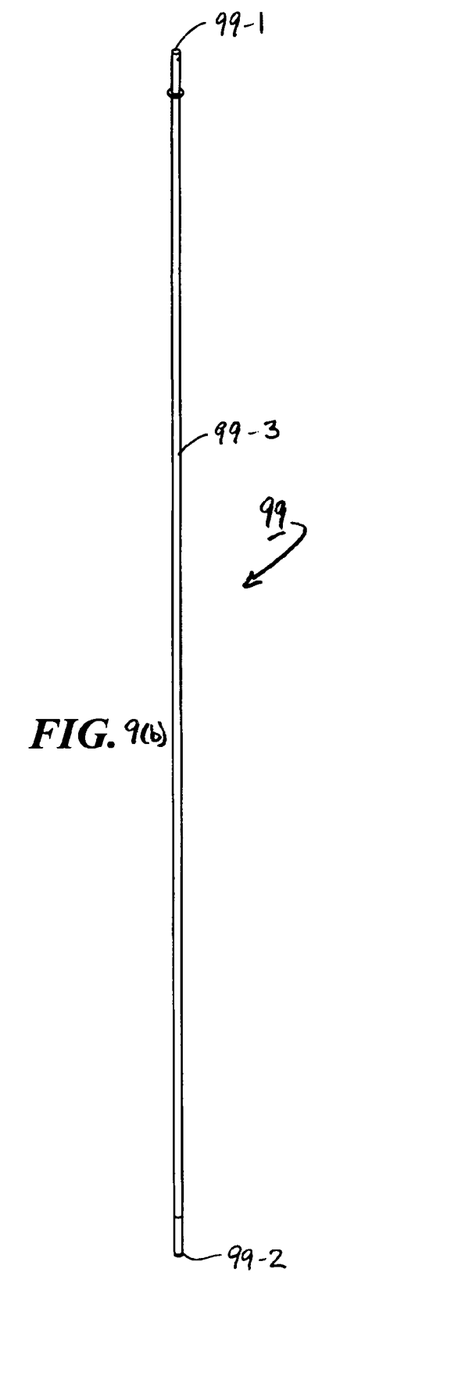
Figure 10A:
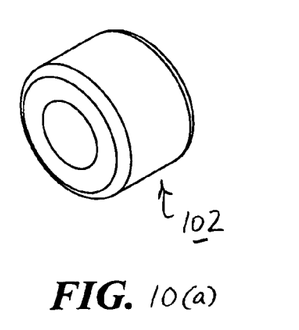
FIGS. 10(a)-(c) are top perspective, end plan and front plan views, respectively, of the rod bearing for the tool shown in FIG. 1(a)
Figure 10B:
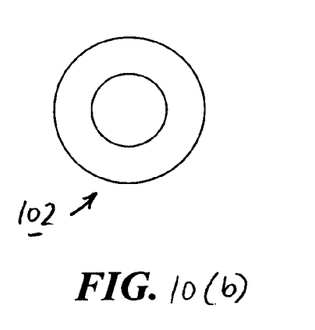
Figure 10C:
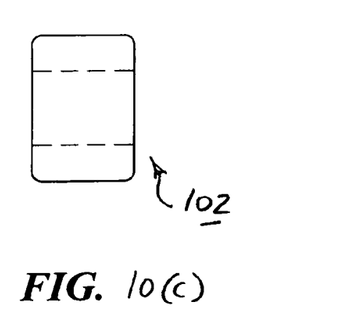

Lock rod 99, shown in isolation in FIGS. 9(a) and 9(b), is an elongated, solid, cylindrical rod that extends longitudinally within pole 13 in a coaxial relationship relative thereto. Lock rod 99 is preferably constructed from a rigid and durable material, such as steel, and includes a first end 99-1, a second end 99-2 and an intermediate portion 99-3 that connects first and second ends 99-1 and 99-2. A rod bearing 102, shown in isolation in FIGS. 10(a)-(c) is constructed as a nylon ring that is fixedly disposed within pole 13 at its approximate midpoint. Bearing 102 is dimensioned to fittingly receive lock rod 99 and thereby limit displacement of lock rod 99 along an axial path within pole 13 (i.e., prevent side-to-side displacement which may compromise stability).

An annular flange 103 is formed onto lock rod 99 proximate first end 99-1, as shown in FIG. 9(a). In addition, a transverse hole 105 is formed in lock rod 99 at first end 99-1. As seen most clearly in FIG. 5(b), with lock rod 99 extending longitudinally within pole 13, first end 99-1 of lock rod 99 protrudes out beyond first end 19 of pole 13, with annular flange 103 abutting against first end 19 to limit longitudinal displacement relative thereto. Furthermore, as noted briefly above, cylindrical handle pin 33 is dimensioned for press-fit insertion through both thru-hole 31 in handle 25 and transverse hole 105 in lock rod 99, handle pin 33 being constructed of a rigid material, such as steel. In this manner, handle pin 33 serves to connect handle 25 to first end 99-1 of lock rod 99.

Second end 99-2 is preferably threaded along its exterior (not shown herein for purposes of simplicity only). As will be described further below, second end 99-1 is designed to threadingly engage pull cam 101 and, in turn, draw pull cam 101 into selective engagement with pivot screw 41 and thereby fix the orientation of head 15 relative to pole 13.

Referring back to FIG. 8, pull cam 101 is a unitary, generally dowel-shaped member constructed from a rigid and durable material, such as steel. Pull cam 101 includes a flattened first end 101-1, a rounded second end 101-2 and a pair of opposing flattened side surfaces 101-3 and 101-4.

Pull cam 101 is sized and shaped in lateral cross-section to fit securely within second end 21 of pole 13, with flattened side surfaces 101-1 and 101-2 disposed flush against the interior surfaces of flattened side surfaces 35-1 and 35-2, respectively, in pole 13. Accordingly, it is to be understood that the fitted relationship of pull cam 101 within pole 13 is such that pull cam 101 is incapable of rotational displacement about its longitudinal axis.

A threaded longitudinal bore 109 extends partially into pull cam 101 through flattened first end 101-1. Bore 109 is dimensioned to threadingly engage second end 99-2 of lock rod 99. Accordingly, it is to be understood that, because pull cam 101 is incapable of rotational displacement, rotation of lock rod 99 results in the vertical displacement of pull cam 101 along lock rod 99 in a coaxial relationship relative thereto.

A transverse opening 111 is formed in pull cam 101 proximate rounded second end 101-2, opening 111 extending through pull cam 101 from flattened side surface 101-3 to flattened side surface 101-4. As can be seen, a roughened surface 113 is formed in the portion of pull cam 101 that immediately defines the bottom surface of opening 111. As will be described further below, the longitudinal displacement of pull cam 101 within pole 13 causes roughened surface 113 in pull cam 101 to selectively engage tips 96 on pivot screw 41 and, in turn, to lock the position of head 15 relative to pole 13.

Operation of Tool 11

As noted above, tool 11 is designed for reconfiguration into a variety of distinct gardening tools by pivoting, and subsequently locking, head 15 at various positions relative to pole 13, which is highly desirable. In particular, by locking head 15 at various positions relative to pole 13, tool 11 can be configured as, among other things, (i) an aerator, (ii) an edger, (iii) a scraper, (iv) a hoe or (v) a rake.

Repositioning and subsequently locking the orientation of head 15 relative to pole 13 is achieved in the following manner. Specifically, as noted above, handle 25 is connected to coupling mechanism 17. Accordingly, by rotating handle 25 counterclockwise, lock rod 99 is similarly rotated in the counterclockwise direction which, in turn, displaces pull cam 101 downward and out of engagement with pivot screw 41. As a result, head 15 is capable of being pivoted relative to pole 13.

It is to be understood that by modifying the particular orientation of head 15 relative to pole 13, a plurality of distinct gardening instruments can be created. In particular, by locking head 15 at various positions relative to pole 13, tool 11 can be configured as, among other things, (i) an aerator, as shown in FIG. 2(a), such that tines 71 extend out from second end 21 at an angle that is parallel with the longitudinal axis of pole 13, (ii) an edger or (iii) a scraper, as shown in FIG. 2(b), such that curved rear edge 55 of edger plate 43 extends out from second end 21 at an angle that is parallel with the longitudinal axis of pole 13, (iv) a hoe, as shown in FIG. 3(a), such that curved rear edge 55 of edger plate 43 extends out from second end 21 at an approximate right angle relative to the longitudinal axis of pole 13, or (v) a rake, as shown in FIG. 3(b), such that tines 71 extend out from second end 21 at an approximate right angle relative to the longitudinal axis of pole 13.

In order to lock the orientation of head 15 in any of the positions set forth above, handle 25 is rotated clockwise which, in turn, causes lock rod 99 to similarly rotate in the clockwise direction. The clockwise rotation of lock rod 99 vertically displaces pull cam 101 upward such that its roughened surface 113 matingly engages tips 96 on pivot screw 41. As a result of the engagement between pull cam 101 and pivot screw 41, head 15 is rendered incapable of pivotal displacement relative to pole 13, thereby locking its orientation relative to pole 13.

Although tool 11 is designed principally for use in gardening, it should be noted that tool 11 is not limited to gardening applications. Rather, it is to be understood that tool 11 could be used in alternative applications to chip, break and/or loosen hardened surfaces, such as ice, rocks, pavement or the like, without departing from the spirit of the present invention.

Alternative Tool Designs

It is to be understood that multi-purpose garden tool 11 need not be limited to a single tool head 15. Rather, it is to be understood that tool 11 could be alternatively designed to include a plurality of separate tool heads that are slidably coupled together to form a single device without departing from the spirit of the present invention.

Figure 11A:
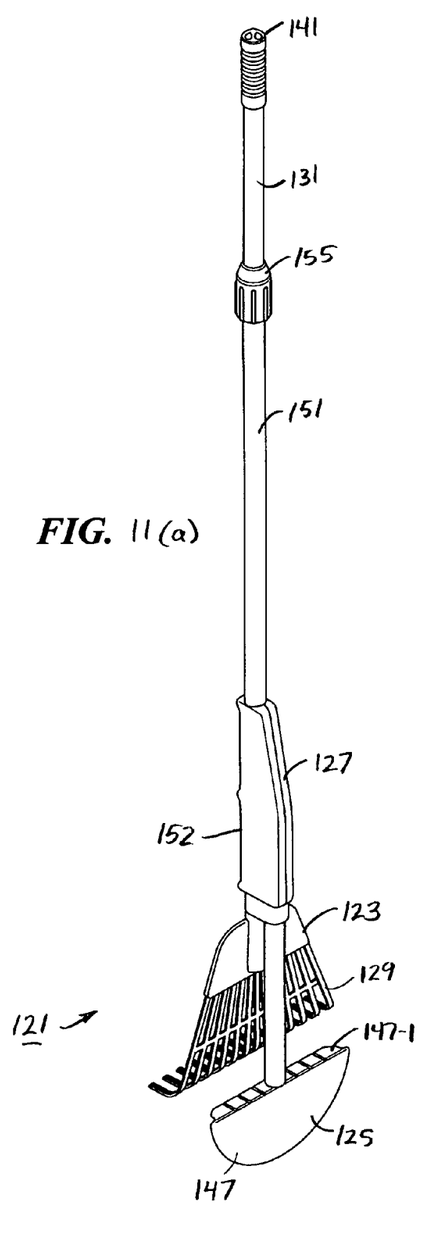
FIG. 11(a) is a top perspective view of a second embodiment of a multi-purpose gardening tool, the tool being constructed according to the teachings of the present invention, the tool being shown configured for use as an edger.
Figure 11B:
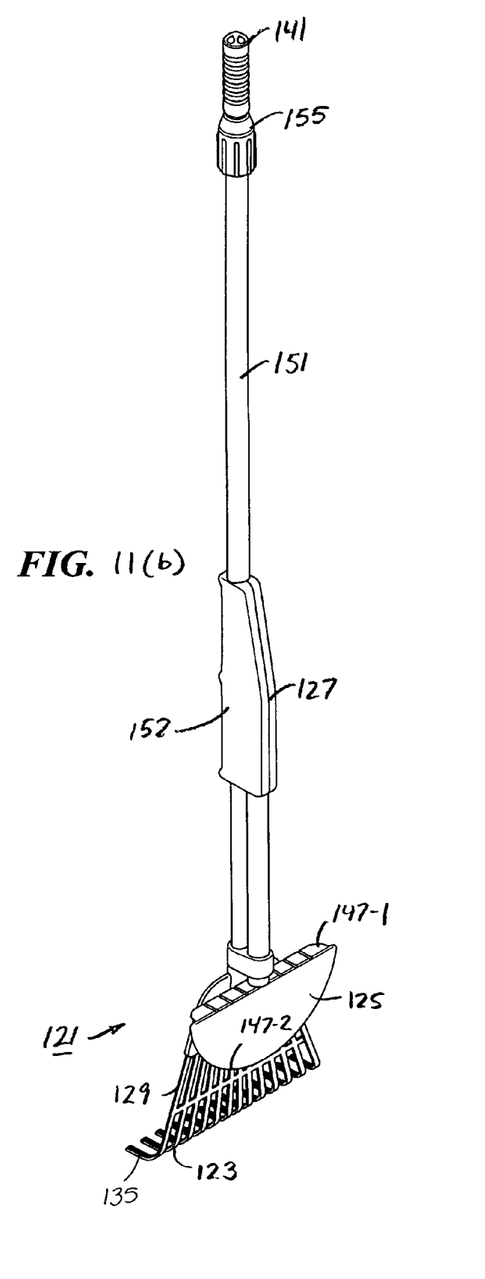
FIG. 11(b) is a top perspective view of the multi-purpose gardening tool shown in FIG. 11(a), the tool being shown configured for use as a rake.

Specifically, referring now to FIGS. 11(a) and 11(b), there is shown a second embodiment of a multi-purpose garden tool, the tool being constructed according to the teachings of the present invention and identified generally by reference numeral 121. As will be described further in detail below, tool 121 is similar to tool 11 in that tool 121 can be reconfigured to create a plurality of distinct gardening instruments, which is highly desirable.

As can be seen, tool 121 includes a rake 123, a spade, or edger, 125 and a coupling mechanism 127 for slidably joining rake 123 and spade 125 together in a front-to-back relationship. As will be described in detail below, coupling mechanism 127 allows for the position of rake 123 to be slidably displaced and releasably locked in place relative to spade 125, thereby enabling tool 121 to be configured for use as either a spade (as shown in FIG. 11(a)) or a rake (as shown in FIG. 11(b)), depending on the needs of the operator.

Figure 12:
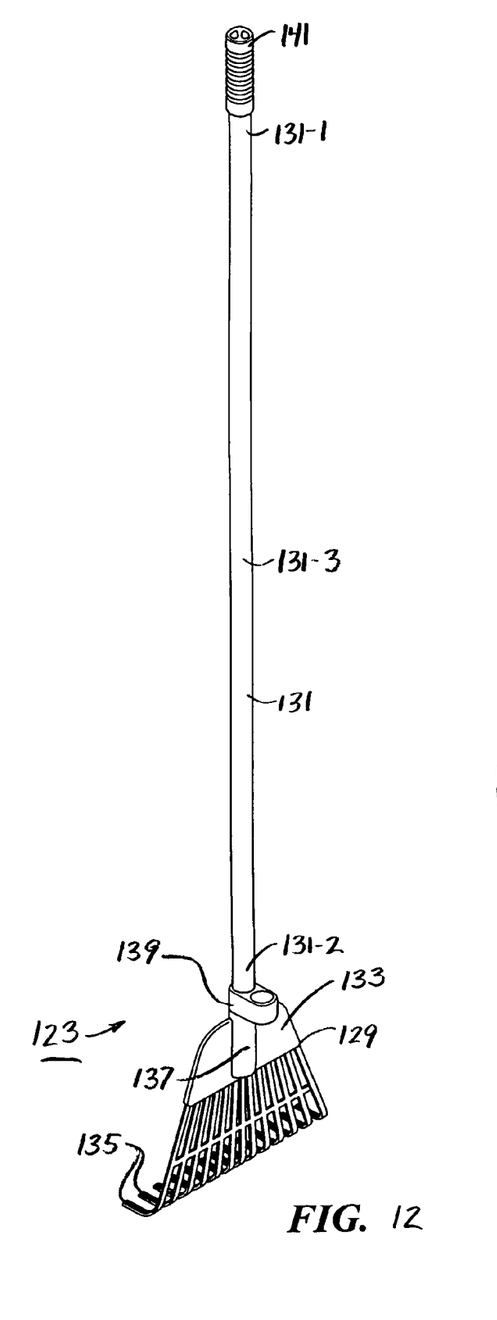
FIG. 12 is a top perspective view of the rake shown in FIG. 11(a)

Referring now to FIG. 12, rake 123 comprises a rake head 129 that is mounted onto one end of an elongated rake pole 131.

Rake head 129 is preferably constructed as a unitary member from a suitable plastic material, such as ABS, through injection molding or other similar process. Rake head 129 includes a generally flat base 133 from which extend a plurality of elongated, L-shaped fingers 135 that are arranged in a fan-like configuration.

Rake head 129 additionally includes an upwardly extending, hollow, tubular receptacle 137 that is dimensioned to fittingly receive one end of rake pole 131, as will be described further below. In addition, a bracket, or collar, 139, circular in transverse cross-section, is integrally formed onto tubular receptacle 137 in a front-to-back relationship. As will be discussed further below, collar 139 is designed to fittingly receive a portion of edger 125 and thereby retain rake 123 and spade 125 in their proper front-to-back relationship.

Rake pole 131 is in the form of an elongated, solid, cylindrical pipe, or rod, that is constructed of a rigid and durable material, such as steel. Pole 131 is approximately 58 inches in length and includes a first end 131-1, a second end 131-2 and an intermediate portion 131-3 that joins first and second ends 131-1 and 131-2.

Figure 13:
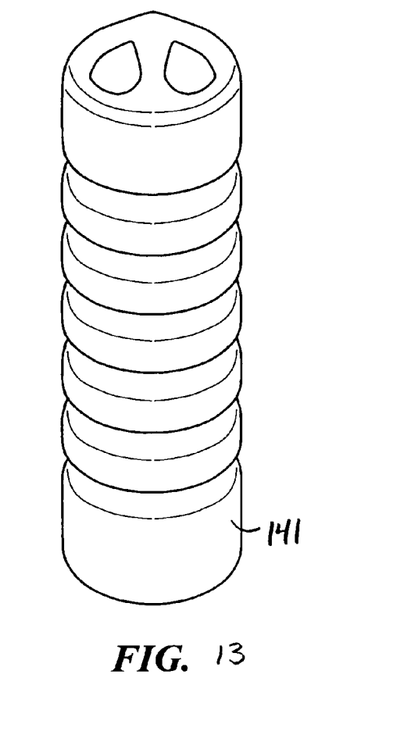
FIG. 13 is a top perspective view of the handle shown in FIG. 11(a)

A handle, or grip, 141 is fittingly mounted on first end 131-1 of pole 131. As seen most clearly in FIG. 13, grip 141 is preferably similar in construction to grip 25.

As noted briefly above, second end 131-2 of pole 131 is fittingly inserted into tubular receptacle 137 on rake head 129. Pole 131 is preferably retained within tubular receptacle 137 by driving a pair of threaded fasteners (not shown) through preformed holes in both pole 131 and receptacle 137 and, in turn, retaining each fastener 143 in place by mounting a corresponding hexagonal nut (not shown) thereon.

Figure 14:
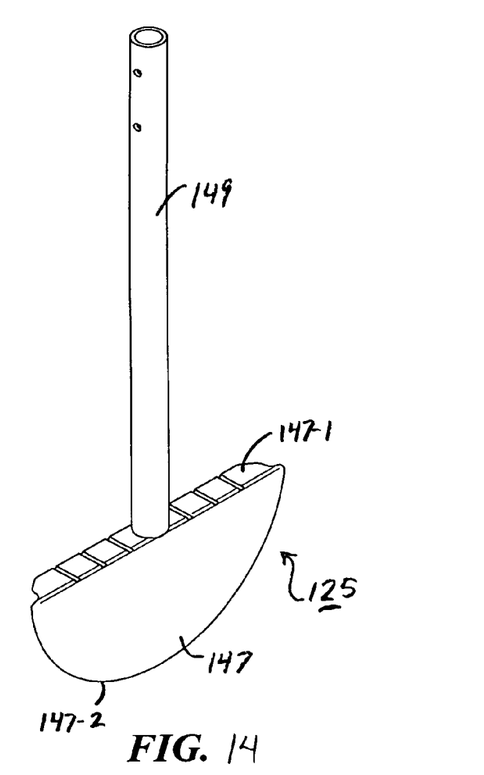
FIG. 14 is a top perspective view of the spade shown in FIG. 11(a)

Referring now to FIG. 14, spade 125 is preferably constructed from a rigid and durable material, such as steel, and includes an edger plate 147 and a tubular pole, or extension, 149.

Edger plate 147 is constructed as a semi-circular sheet of steel that includes a straight top edge 147-1 and a curved bottom edge 147-2. Top edge 147-1 is bent at a right angle relative to the remainder of plate 147 so as to define a flange, or step surface, that is useful for driving spade 125 into material by foot. Bottom edge 147-2 is preferably beveled or similarly sharpened to facilitate use in penetrating certain materials.

Pole 149 is in the form of a shortened, cylindrical rod that extends orthogonally up from flanged top edge 147-1. As noted briefly above, pole 149 extends through collar 139 in order to retain rake 123 and spade 125 in their proper front-to-back relationship.

Referring back to FIGS. 11(a) and 11(b), coupling mechanism 127 serves to both slidably join rake 123 and spade 125 together in a front-to-back relationship and, in addition, releasably lock in place the position of rake 123 relative to spade 125. As can be seen, coupling mechanism 127 includes a slide tube 151 for axially receiving rake pole 131, a housing 152 for retaining slide tube 151 and edger pole 149 in a fixed front-to-back relationship, a cam 153 mounted on the free end of slide tube 151 and a cam lock 155 threadingly mounted on cam 153.

Figure 15A:
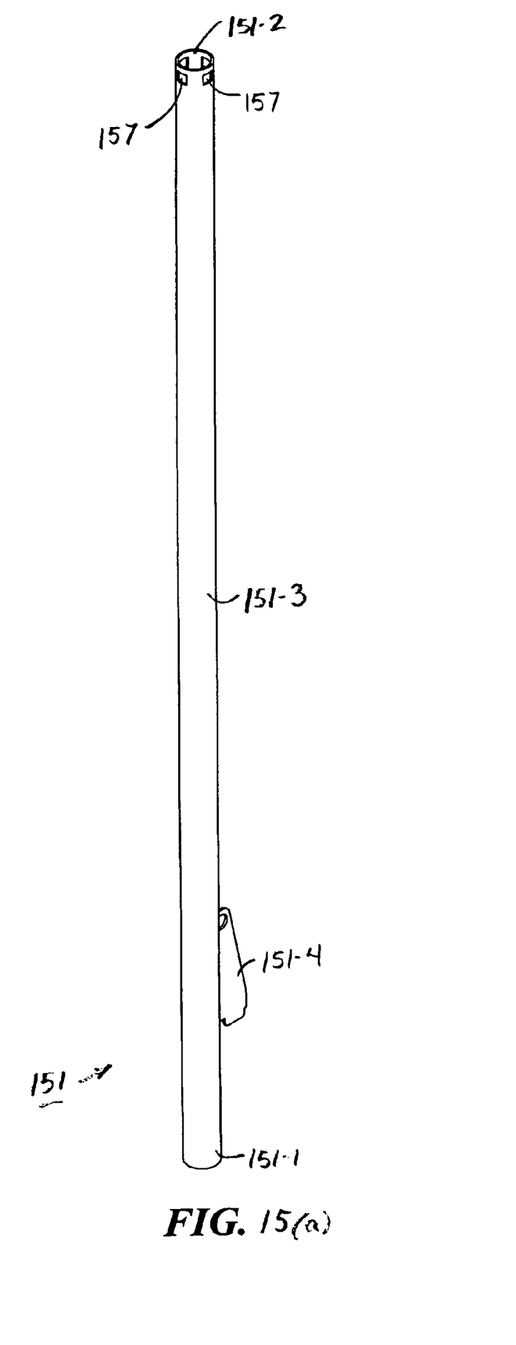
FIGS. 15(a) and 15(b) are top perspective and front plan views, respectively, of the slide tube shown in FIG. 11(a)
Figure 15B:
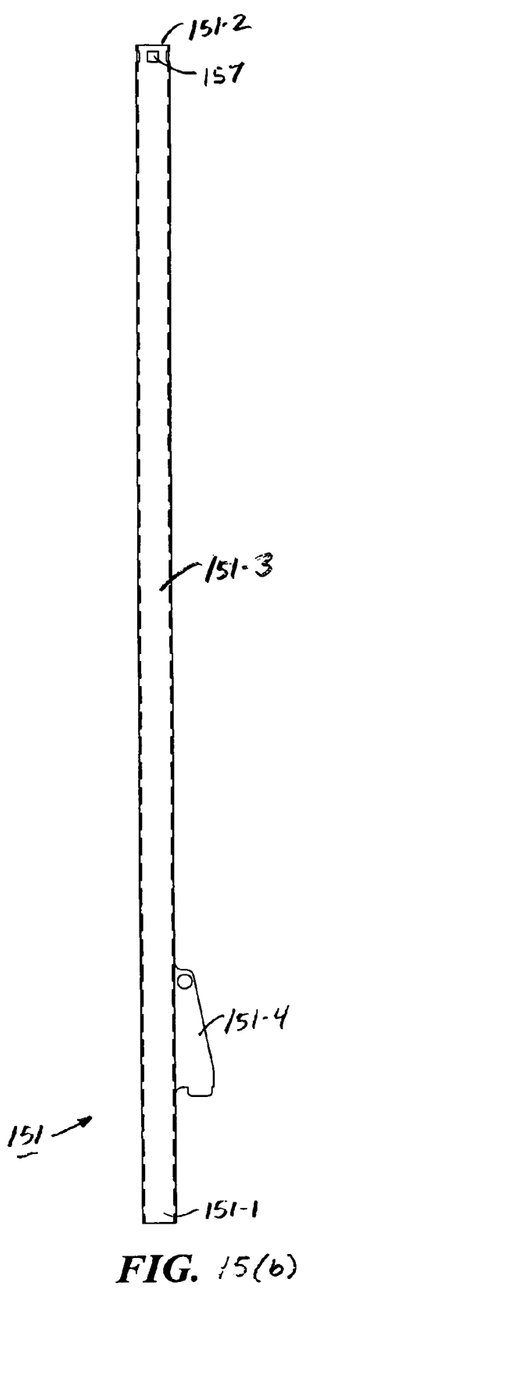

Slide tube 151, shown in isolation in FIGS. 15(a) and 15(b), is in the form of an elongated, hollow, tubular member that is constructed of a rigid and durable material, such as steel. Slide tube 151 is approximately 38.75 inches in length and is dimensioned to slidably receive rake pole 131 in a telescoping manner. Accordingly, it is to be understood that rake pole 131 can be axially displaced within slide tube 151 using handle 141, which extends beyond slide tube 151.

Slide tube 151 is shaped to include a first end 151-1, a second end 151-2, and an intermediate portion 151-3 joining first and second ends 151-1 and 151-2. As can be seen, a thin, outwardly protruding fin 151-4 is formed on intermediate portion 151-3 proximate first end 151-1. As will be described further below, fin 151-4 helps retain slide tube 151 properly in place within housing 152.

Second end 151-2 of slide tube 151 is slightly crimped and is shaped to define a plurality of square-shaped openings 157. In this manner, second end 151-2 is appropriately designed to receive cam 153, as will be described further in detail below.

Figure 16:
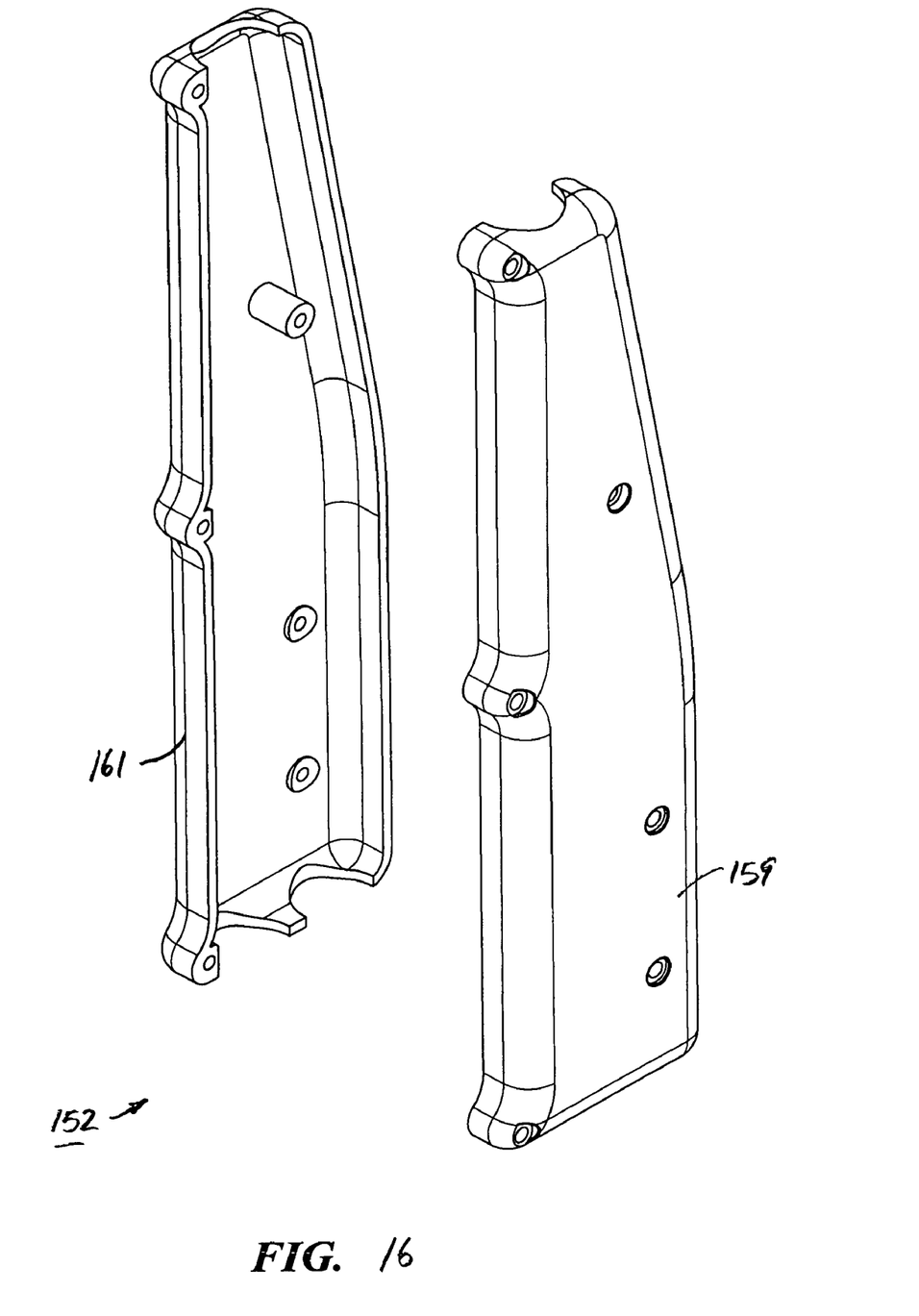
FIG. 16 is an exploded, left side perspective view of the housing shown in FIG. 11(a)

Referring now to FIG. 16, housing 152 is preferably constructed out of a suitable plastic material, such as ABS, through injection molding or other similar process. Housing 152 is in the form of a hollowed neck that includes a left side casing 159 and a right side casing 161 that are permanently joined together by screws. Together, left and right side casing 159 and 161 define first and second longitudinally extending, parallel passageways that are arranged in a front-to-back relationship, each passageway being generally circular in transverse cross-section.

As can be appreciated, one of the passageways in housing 152 is dimensioned to fittingly receive pole 149 of edger 125. In order to fixedly retain pole 149 in place within housing 152, a pair of threaded screws (not shown) are preferably driven through preformed holes in left side casing 159, through preformed transverse holes in pole 149 and into threaded engagement within self-tapping bores in right side casing 161.

Similarly, the other of the passageways in housing 152 is dimensioned to fittingly receive first end 151-1 of slide tube 151. Preferably fin 151-4 on slide tube 151 mates with internal design elements of housing 152 to fixedly retain slide tube 151 in place within housing 152. In this capacity, it is to be understood that housing 152 retains pole 149 of edger 125 and first end 151-1 of slide tube 151 fixed in place therein in a front-to-back, parallel relationship.

Figure 17A:
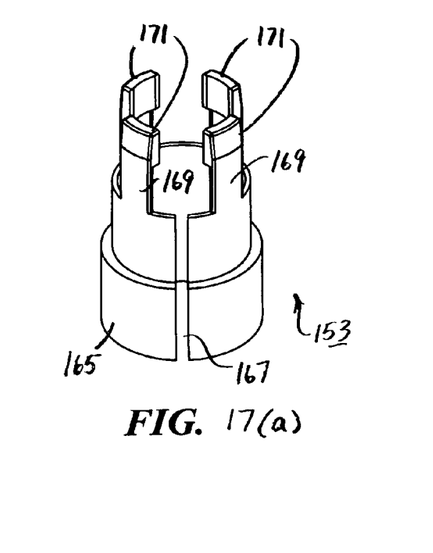
FIGS. 17(a) and 17(b) are top perspective and front plan views, respectively, of the cam for the tool shown in FIG. 11(a)
Figure 17B:
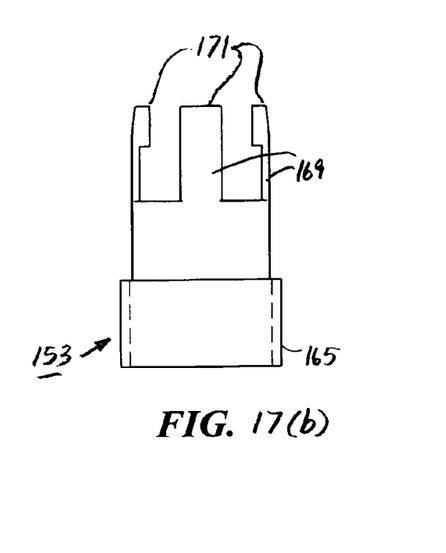

Cam 153, shown in isolation in FIGS. 17(a) and 17(b), is preferably constructed out of a suitable plastic material, such as ABS, through injection molding or other similar process. Cam 153 comprises an externally threaded, annular collar 165 that includes a narrow longitudinal slot 167 to allow for slight radial expansion. Cam 153 additionally includes four separate, equidistantly arranged pivotable fingers 169 that extend orthogonally out from the top edge of collar 165. Each finger 169 includes an engagement tab 171 at its free end that is dimensioned to selectively engage rake pole 131 to lock the relative position of rake 123 relative to spade 125, as will be described further in detail below.

As noted briefly above, cam 153 is designed to be mounted on second end 151-2 of slide tube 151. Specifically, collar 165 is dimensioned to slide tightly over second end 151-2, collar 165 expanding to the extent necessary to allow for its mounting. It should be noted that collar 165 is mounted on slide tube 151 such that engagement tab 171 of each pivotable finger 169 aligns directly within a corresponding square-shaped opening 157 in slide tube 151, each finger 169 being naturally biased such that tabs 171 do not limit longitudinal displacement of rake pole 131 within slide tube 151.

Figure 18:
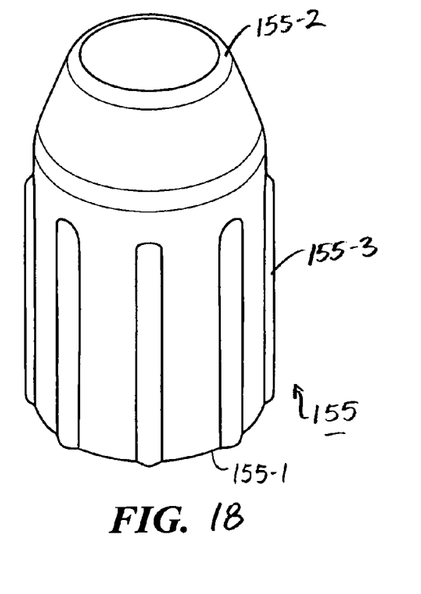
FIG. 18 is a top perspective view of the cam lock shown in FIG. 11(a).

Cam lock 155, shown in isolation in FIG. 18, is preferably constructed out of a suitable plastic material, such as ABS, through injection molding or other similar process. Cam lock 155 is represented herein as being in the form of a hollow, conical sleeve that includes an open, widened first end 155-1, an open, narrowed second end 155-2, a threaded interior surface (not shown), and a ribbed exterior surface 155-3. As can be appreciated, the interior surface of cam lock 155 tapers gradually inward from first end 155-1 to second end 155-2.

As part of the assembly process for tool 121, cam lock 155 is orientated such that its widened end 155-1 is directed downward. Positioned as such, cam lock 155 is then telescopingly mounted over first end 131-1 of rake pole 131 and slid axially down into threaded engagement with cam 153. Clockwise rotation of cam lock 155 serves to further advance cam lock 155 down over cam 153. Due to the tapered nature of the threaded interior surface of cam lock 155, the downward displacement of cam lock 155 in turn applies a gradually increasing inward radial force onto each pivotable finger 169 on cam 153. As fingers 169 pivot inward, tabs 171 eventually frictionally engage rake pole 131 to the extent that rake 123 is incapable of axial displacement, thereby locking the position of rake 123 relative to spade 125.

Operation of Tool 121

In view of the description above, it is to be understood that tool 121 can be used in the following manner to produce a pair of functional gardening instruments. Specifically, cam lock 155 is rotated in the counterclockwise direction until its inward radial force applied onto cam 153 no longer draws tabs 171 into frictional engagement with rake pole 131. With tabs 171 disengaged, the operator is able to axially slide rake pole 131 within slide tube 151 using handle 141.

For use of tool 11 as an edger, handle 141 is pulled upward until the entirety of rake head 129 is disposed above top edge 147-1 of edger plate 147, as shown in FIG. 11(a). With edger plate 147 now fully exposed, cam lock 155 is rotated clockwise until its radial force applied to cam 153 draws tabs 171 into engagement with rake pole 131, thereby locking the relative positions of rake 123 and edger 125. As such, by grasping handle 141, the user is able to readily operate tool 121 as a spade, edger or other similar gardening instrument.

For use of tool 11 as a rake, cam lock 155 is first rotated in the counterclockwise direction so that rake pole 131 is capable of slidable displacement within slide tube 151. Then, handle 141 is urged downward until the free end of each finger 135 on rake head 129 is disposed below bottom edge 147-2 of edger plate 147, as shown in FIG. 11(b). Positioned as such, cam lock 155 is rotated clockwise until its radial force applied to cam 153 draws tabs 171 into engagement with rake pole 131, thereby locking the relative positions of rake 123 and edger. As such, by grasping handle 141, the user is able to readily operate tool 121 as a rake.

The embodiments shown in the present invention are intended to be merely exemplary and those skilled in the art shall be able to make numerous variations and modifications to them without departing from the spirit of the present invention. All such variations and modifications are intended to be within the scope of the present invention as defined in the appended claims.

What is claimed is:
1. A multi-purpose gardening tool, the tool comprising:
(a) an elongated, hollow pole having a first end and a second end,
(b) a unitary gardening head, the unitary gardening head comprising,
   (i) a semi-circular edger plate having a sharpened curved edge, and
   (ii) a comb-like rake mounted on the edger plate, the rake having a plurality of sharpened tines,
(c) a coupling mechanism for pivotally connecting the second end of the elongated pole to the gardening head, the coupling mechanism releasably locking the position of the gardening head relative to the elongated pole in a variety of fixed positions to create a plurality of distinct gardening instruments, the coupling mechanism comprising,
   (i) a pivot screw pivotally connecting the second end of the pole to the gardening head,
   (ii) a lock rod extending longitudinally within the hollow pole, the lock rod having a first end and a second end, the first end being connected to a handle, and
   (iii) a pull cam mounted within the second end of the hollow pole, the pull cam being threadingly coupled to the second end of the lock rod wherein the pull cam includes a transverse opening that is dimensioned to receive the pivot screw, the transverse opening being partially defined by a roughened surface,
   (iv) wherein rotation of the lock rod longitudinally displaces the pull cam within the hollow pole, and
(d) the handle rotatably mounted on the first end of the pole, the handle being fixedly connected to the coupling mechanism, wherein actuation of the coupling mechanism in order to releasably lock the position of the gardening head relative to the elongated pole is achieved through rotation of the handle.

2. The multi-purpose gardening tool as claimed in claim 1 wherein the pivot screw is in the form of an elongated pin that includes an enlarged first end, a second end and an intermediate portion.

3. The multi-purpose gardening tool as claimed in claim 2 wherein the unitary gardening head further comprises first and second brackets that are configured to receive the second end of the pole therebetween.

4. The multi-purpose gardening tool as claimed in claim 3 wherein a projection is formed on the intermediate portion of screw, the projection being square-shaped in transverse cross-section and dimensioned to be fittingly retained within a complementary opening formed in the first bracket of the gardening head.

5. The multi-purpose gardening tool as claimed in claim 2 wherein the intermediate portion of the pivot screw includes a plurality of outwardly extending engagement teeth.

6. The multi-purpose gardening tool as claimed in claim 5 wherein the roughened surface in the pull cam selectively engages the engagement teeth in the pivot screw to lock the position of the gardening head relative to the elongated pole.

* * * * *